United States Patent [19]

Hagl

[11] Patent Number: 5,151,930
[45] Date of Patent: Sep. 29, 1992

[54] METHOD FOR PERSONAL PAGING A TELEPHONE PRIVATE BRANCH EXCHANGE WITH THE ASSISTANCE OF A PERSONAL PAGING DEVICE THAT OFFERS MUTUALLY DIFFERENT OPERATING MODES FOR PERSONAL PAGING

[75] Inventor: Ernst Hagl, Munich, Fed. Rep. of Germany

[73] Assignee: Siemens Aktiengesellschaft, Munich, Fed. Rep. of Germany

[21] Appl. No.: 586,209

[22] Filed: Sep. 21, 1990

[30] Foreign Application Priority Data

Sep. 21, 1989 [DE] Fed. Rep. of Germany ....... 3931533

[51] Int. Cl.⁵ .......................................... H04M 11/00
[52] U.S. Cl. ..................................... 379/57; 379/198
[58] Field of Search ................... 379/56, 57, 63, 245, 379/198, 246, 250

[56] References Cited

U.S. PATENT DOCUMENTS

| | | | |
|---|---|---|---|
| 4,642,425 | 2/1987 | Guinn, Jr. et al. | 379/57 |
| 4,680,785 | 7/1987 | Akiyama et al. | 379/57 |
| 4,940,963 | 7/1990 | Gutman et al. | 379/57 |
| 5,070,521 | 12/1991 | Warner et al. | 379/58 |

FOREIGN PATENT DOCUMENTS 0187141 9/1985 Japan ................................ 379/57

Primary Examiner—James L. Dwyer
Assistant Examiner—Dwayne D. Bost
Attorney, Agent, or Firm—Hill, Van Santen, Steadman & Simpson

[57] ABSTRACT

A personal paging equipment is connected to a telephone private branch exchange having a central controller and a central memory, wireless call (ringing) device belonging to the personal paging equipment in addition to the paging transmitters, these call or ringing devices dependent on the selected operating mode of the personal paging equipment, providing the subscribers to be called either with only a ringing signal or, in addition to the ringing signal, the telephone number of the calling subscriber as well, for example, via an integrated display. When the page request derives from an exchange, the telephone number of the calling subscriber is replaced by an identifier information by the controller and is forwarded to the personal paging equipment. After selecting the identifier information at an arbitrary telephone set, the connection is through-connected between the waiting, calling subscriber and the answering subscriber.

2 Claims, 1 Drawing Sheet

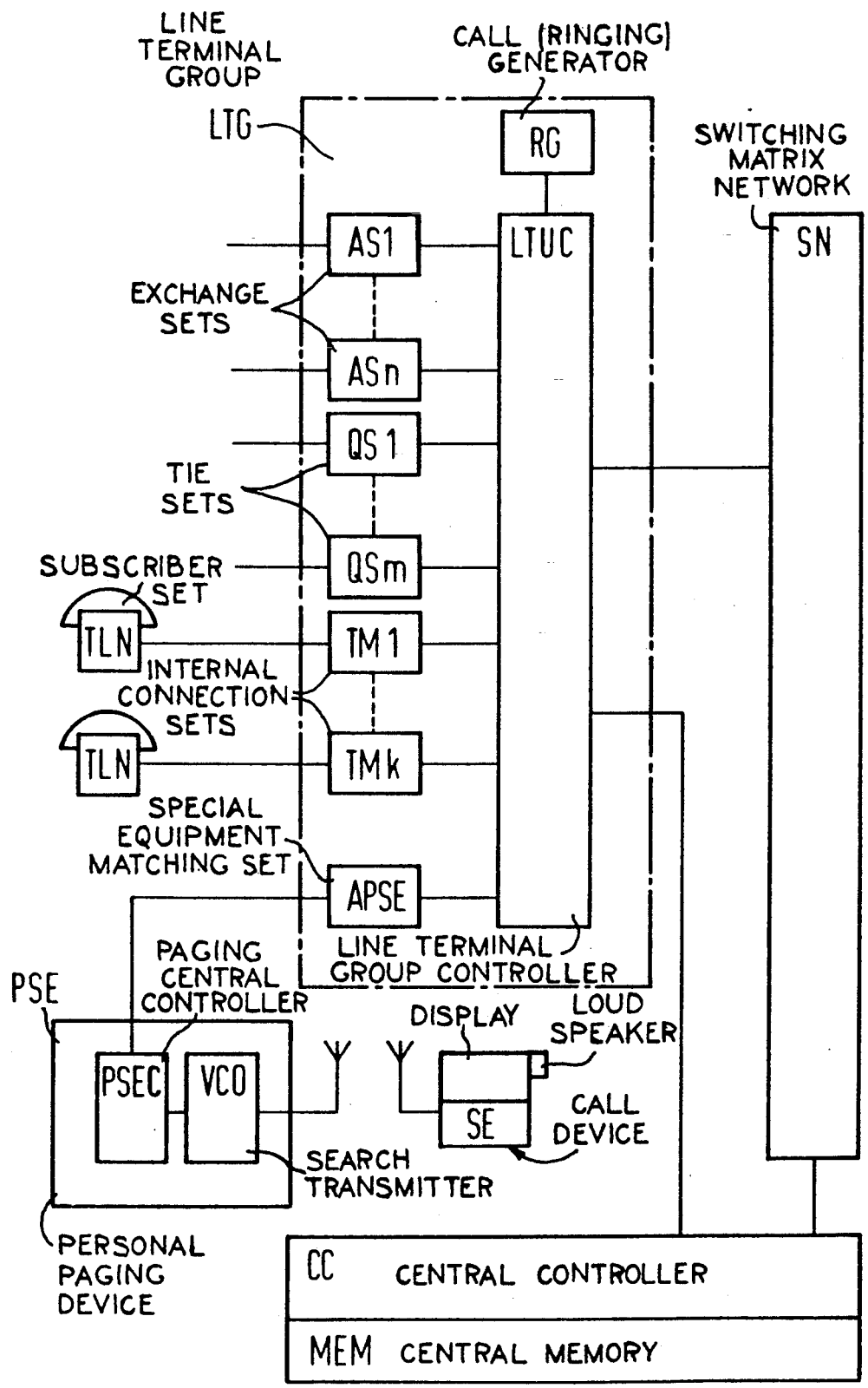

METHOD FOR PERSONAL PAGING A TELEPHONE PRIVATE BRANCH EXCHANGE WITH THE ASSISTANCE OF A PERSONAL PAGING DEVICE THAT OFFERS MUTUALLY DIFFERENT OPERATING MODES FOR PERSONAL PAGING

BACKGROUND OF THE INVENTION

1. Field of the Invention

The present invention relates to a method for a personal paging in a telephone private branch exchange.

More specifically, the invention relates to such a method in which the private branch exchange has a central control device, a central memory, and a central personal paging device that respectively encompasses call apparatus allocated to the persons to be paged as needed, to which call apparatus, given an appropriately preselected operating mode of the personal paging device, the subscriber line number of the calling subscriber communicated from the central control of the personal paging device is transmitted in addition to a call signal, this being optically or acoustically transmitted by the call device and the line number of the calling subscriber is utilized by any arbitrary subscriber set of the telephone private branch exchange for connecting the calling subscriber to the call subscriber.

2. Description of the Prior Art

Within telephone private branch exchanges, personal paging devices offer the possibility of being able to reach specific subscribers at any time. To this end, these subscribers carry a portable call device. The presence of a call request is indicated to the subscriber with this device. The signalization can occur in various ways and with a variety of informational scope. In a simple operating mode of the personal paging device, the signaling occurs with a ringing tone or by lighting a signal lamp. What this means for the call subscriber is that he should seek out a subscriber set of the telephone private branch exchange as quickly as possible and that he must identify himself thereat on the basis of a previously-declared identifying number if the connection is to be completed. Dependent on the operating mode, he either receives information regarding who wishes to reach him or he is directly connected to the calling subscriber only on the basis of this report.

Another possibility of signaling offers an operating mode wherein the ringing tone, or the signal lamp, sounds or lights in combination with an optical display on a display device or, respectively, with an acoustical message via a loudspeaker, of the call device. The telephone number of the calling subscriber is already transmitted to the called subscriber via the display or, respectively, via the loudspeaker, at the time of signaling. The paging event is thereby separated from the reporting event. The call subscriber can therefore realize the desired connection at a time suitable for him. This operating mode is permanently set since the persons that have a calling device expect that they will also be informed of the telephone number of the calling subscriber via the display, or the loudspeaker, in the case of a personal call. A constant changing in the operating mode of the personal paging device, together with the change of the signaling scope involved therewith, would lead to confusion of the persons to be called. Such a change of the operating mode, however, would always be necessary when the telephone number of the calling subscriber needed for executing the page request given the preselected operating mode is not known to the telephone private branch exchange.

This telephone number is consistently not known when the call request comes from an external telephone exchange. This telephone exchange can be connected to the telephone private branch exchange via a tie trunk or inter-exchange link. Given such a call request, the telephone private branch exchange is informed of only the purpose of the switching event, but not of the subscriber line number of the calling subscriber. When the operating mode is not changed in such a case, then this leads to the situation that the personal page is not possible due to the lack of information. The calling subscriber is either routed to a manual switching position or he receives a busy signal.

SUMMARY OF THE INVENTION

The object of the present invention is to nevertheless enable page requests that are, in fact, fundamentally possible, but are rejected by the personal paging device as a consequence of the established operating mode because of the non-presence of the subscriber line number.

The above object is achieved, according to the present invention, in that the control device of the telephone private branch exchange communicates an identifier information to the personal paging device as needed given the non-presence of the line number of the calling subscriber; in that, on the basis of this identifier information, data deposited in the memory of the telephone private branch exchange for referencing the line set at which the page request has reached the telephone private branch exchange and a subscriber line number of the called subscriber are allocated to one another, and in that an acknowledgment tone that signals the execution of the page request is transmitted to the subscriber set of the calling subscriber.

When, therefore, a telephone number of the calling subscriber is not present, then the control of the telephone private branch exchange checks to see whether the personal paging device is working in an operating mode that effects the communication of the line number of the calling subscriber via the call device in addition to the ringing tone or in addition to the illumination of the signal lamp. When this is the case, then the control generates an identifier information that is communicated to the personal paging device instead of the expected line number of the calling subscriber. On the basis of the special characteristics of which he is aware, flashing display at the display device or specific numerical values, the call subscriber whom this identifier information reaches recognizes with reference to the identifier information that it is not an ordinary page request deriving from his own exchange and can consequently immediately proceed to the closest subscriber set of the telephone private branch exchange and thereat input the identifier information communicated to him. This can be a number or a number combined with a special character, for example, by pressing the "asterisk" key (*) present at push button dialing sets. The identifier information input by the called subscriber therefore reaches the central control of the telephone exchange. The control procedure sequencing there is dependent on the nature of the identifier information.

When the identifier information corresponds to the telephone number of the called subscriber, then, after determining, for example on the basis of a set flag, that a page request is present for this line number, the control accesses a memory location established for this purpose, wherein the data regarding the line set are deposited, for example in the form of an address. When the identifier information corresponds to the data concerning the line set, for example, a number, with whose assistance a central control can access the line set directly, as in the case of a subscriber line number, or indirectly, for example, via address conversion, then the control sets up the connection between the paging subscriber and the paged subscriber via the switching matrix network from one subscriber to the other subscriber as with standard switching events.

In order to assure that the paging subscriber does not hang up and thus make a setup of the call connection impossible, an acknowledgement tone having a defined frequency and pulse duration is transmitted to the calling subscriber.

The method makes it possible to utilize the advantages, for example, of direct display of the telephone number of the subscriber on the display of the call device and of one operating mode of the personal paging device without thereby having to accept what are otherwise disadvantageous page requests from outside the telephone private branch exchange. Compared to operating modes that do not transmit any information in addition to the ringing signal, the further advantage is achieved, given an appropriately-designed identifier information, that the called subscriber can distinguish whether the page request derives from an exchange line or from a tie trunk.

In accordance with a particular feature and development of the invention, the identifier information transmitted from the controller of the telephone private branch exchange to the personal paging device references a reporting procedure. The identifier information communicated to the called subscriber and the telephone number of the calling subscriber must be selected at a subscriber set of the exchange system. The reporting procedure referenced by the identifier information accesses a table in which the data concerning the line set at which a page request has reached the telephone private branch exchange are entered dependent on the telephone number of a called subscriber. With the information concerning the line set at which the calling subscriber has reached the telephone private branch exchange that are now available, the reporting procedure sets up the desired connection on the basis of control instructions.

In a particularly simple manner, this procedure allows the method of the present invention to be subsequently introduced into an existing telephone private branch exchange. All of the control executions need not be redesigned; rather, this recording procedure must be merely adapted to the existing programs.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic illustration of apparatus for carrying out the present invention illustrated within the framework of a telephone private branch exchange.

DESCRIPTION OF THE PREFERRED EMBODIMENTS

Referring to the drawing, a telephone private branch exchange is illustrated as comprising a central controller CC, a central memory MEM, a switching matrix network SN, a line terminal group LTG and a personal paging device PSE. Inter-exchange connections are produced via exchange sets AS, interconnections to other private branch exchanges are produced via tie sets QS and connection to the subscriber terminal equipment is produced via internal connection sets TM. In common with a call (ringing) generator RG, a line terminal group controller LTUC and a special equipment matching set APSE for special equipment, these form the line terminal group LTG. The personal paging device PSE is coupled to the special equipment matching set APSE.

A call request coming from an exchange line reaches the telephone private branch exchange via one of the exchange sets AS. The line terminal group controller LTUC reports the existing call request, specifying the telephone number of the requested subscriber and the address of the exchange set AS at which the connection request has reached the system, to the central controller CC. The central controller CC determines that a call rerouting request to the personal paging device PSE is entered in the central memory MEM for the requested subscriber line number. Since the call comes from outside of the private branch exchange, a special reporting procedure for external search request is activated. This effects that the telephone number of the requested subscriber is entered in a search table in the central memory MEM in common with the address of the exchange set AS at which the call request reached the exchange. The number of the reporting procedure that has the format of an ordinary subscriber line number and the line number of the called subscriber are then communicated from the central controller CC to a paging central controller PSEC of the personal paging device PSE via the line terminal group controller LTUC and via the special equipment matching set APSE. The controller PSEC of the personal paging device PSE activates a search transmitter VCO that transmits the number of the reporting procedure by radio link to call device SE of the requested subscriber. The call device SE displays the number of the reporting procedure on a display and outputs ringing characters via a loudspeaker.

At the same time, the personal paging device PSE acknowledges to the central controller CC that the search request is executed. In response thereto, the central controller CC activates the line terminal group controller LTUC that transmits and acknowledgement tone to the calling subscriber via the call (ringing) generator RG and via the exchange set AS.

The called subscriber answers in that he selects the reporting procedure number displayed on the display device and his own subscriber line number at an arbitrary subscriber set TLN of the telephone private branch exchange. In response thereto, the central controller CC activates the reporting procedure that, with the assistance of the subscriber line number input by the called subscriber, searches the table and forwards the address of the exchange set AS assigned to the subscriber line number to the central controller CC. The central controller CC through-connects the connection between the calling subscriber and the called subscriber via the switching matrix network SN in that it connects the exchange set AS to the subscriber set TLN at which the sought subscriber has answered.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for personal paging in a telephone private branch exchange comprising a central controller, a central memory, a personal paging device for selective communication with a plurality of call devices each assigned to a respective person to be paged, a plurality of external connection sets for connecting calls external of the telephone private branch exchange and a plurality of internal connection sets connected to subscriber telephone instruments of the telephone private branch exchange; the personal paging device, in a predetermined operating mode of the type wherein calls originating in the telephone private branch exchange from one of the telephone instruments cause call information including the subscriber line number of the calling subscriber to be communicated to the personal paging device from the central controller, hence in addition to a call signalization the line number of the calling subscriber is reproduced; at the call device in the case in which a calling subscriber is external of the private branch exchange and the line number of the calling subscriber is absent, the method for personal paging comprising the steps of:

generating a calling line identifier information in the central controller;

communicating said identifier information from the central controller to the personal paging device and reproducing said identifier information of the signaled call device;

storing data in the central memory for designating the external connection set of the calling subscriber and the subscriber line of the called subscriber in allocation thereto;

transmitting an acknowledgment to the external connection set of the calling subscriber to indicate to the calling subscriber that the exchange has received the page requested and to hold the line; and receiving the identifier information from an arbitrary subscriber telephone instrument causing the central controller to connect the internal connection set of the arbitrary subscriber telephone instrument to the external connection set of the calling subscriber.

2. The method of claim 1, and further comprising the steps of:

utilizing the identifier information to determine a reporting procedure;

inputting the identifier information by the called subscriber and the telephone number thereof at a telephone instrument of the exchange; and accessing a table of the memory storing the data designating the external connection set of the calling subscriber in the reporting procedure and the line number of the call subscriber assigned thereto; and outputting the access data to the central controller to cause the central controller to set up a connection between the called subscriber and the calling subscriber.

* * * * *